United States Patent
Hatano et al.

(10) Patent No.: US 7,824,043 B2
(45) Date of Patent: Nov. 2, 2010

(54) REFLECTION PREVENTING LAYERED PRODUCT AND OPTICAL MEMBER

(75) Inventors: Taku Hatano, Tokyo (JP); Tetsuya Toyoshima, Tokyo (JP)

(73) Assignee: Zeon Corporation, Tokyo (JP)

( * ) Notice: Subject to any disclaimer, the term of this patent is extended or adjusted under 35 U.S.C. 154(b) by 673 days.

(21) Appl. No.: 11/628,844

(22) PCT Filed: Jun. 9, 2005

(86) PCT No.: PCT/JP2005/010610
§ 371 (c)(1),
(2), (4) Date: Jul. 19, 2007

(87) PCT Pub. No.: WO2005/121841
PCT Pub. Date: Dec. 22, 2005

(65) Prior Publication Data
US 2008/0013177 A1    Jan. 17, 2008

(30) Foreign Application Priority Data
Jun. 11, 2004   (JP) .............................. 2004-174387

(51) Int. Cl.
*G02B 27/00* (2006.01)
(52) U.S. Cl. ................... 359/601; 359/582; 359/585; 359/586; 428/323
(58) Field of Classification Search ........................ None
See application file for complete search history.

(56) References Cited

U.S. PATENT DOCUMENTS

| 6,310,858 | B1 | 10/2001 | Kano et al. |
| 6,383,559 | B1 | 5/2002 | Nakamura et al. |
| 2005/0051791 | A1* | 3/2005 | Gotoh et al. .................. 257/99 |

FOREIGN PATENT DOCUMENTS

| JP | 09-288202 A | 11/1997 |
| JP | 11-072602 A | 3/1999 |
| JP | 11-211901 A | 8/1999 |
| JP | 2001-253004 A | 9/2001 |
| JP | 2003-149642 A | 5/2003 |

\* cited by examiner

*Primary Examiner*—Stephone B Allen
*Assistant Examiner*—Derek S Chapel
(74) *Attorney, Agent, or Firm*—Birch, Stewart, Kolasch & Birch, LLP

(57) ABSTRACT

A reflection preventing layered product is provided by laminating a high refractive index layer and a low refractive index layer, which has a refractive index lower than that of the high refractive index layer, in that order on a transparent plastic film, directly or through another layer. The low refractive index layer has a surface resistance of $1.0 \times 10^{10}$ ohm/square inch or less, a total light remittance of 94% or more, and a refractive index of 1.25-1.37. An optical member provided with the reflection preventing layered product is also provided. This optical member is preferably a polarizing plate with reflection preventing function used for a liquid crystal display. The reflection preventing layered product excels in transparency, mechanical strength, antistaticity, and reflection preventing characteristics.

9 Claims, 1 Drawing Sheet

REFLECTION PREVENTING LAYERED PRODUCT AND OPTICAL MEMBER

TECHNICAL FIELD

The present invention relates to a reflection preventing layered product and an optical member used for a display of electronic equipment and the like. In particular, the invention relates to a reflection preventing layered product formed from a high refractive index layer and a low refractive index layer laminated on a transparent plastic film in that order and to an optical member in which the reflection preventing layered product is used.

BACKGROUND ART

Conventionally, transparent plastics are widely used as transparent substrates for a display for electronic equipment such as personal computers, TVs, and cellular phones. In spite of the advantages of being lightweight, being hard to be damaged, and the like as compared with glass which is also a transparent substrate, the transparent plastics possess a low hardness, are easily scratched, and easily have electrostatic dust attached thereto. For this reason, the plastic substrate is generally provided with a hard coat layer, an antistatic layer, and the like on the surface.

In addition, a reflection preventing layer may also be provided on the display of electronic equipment in order to suppress external image reflection, light reflection, glare, and the like and to increase visibility of a screen.

More recently, according to the demand for decreasing the weight and size (thickness) of electronic equipment, a reflection preventing film possessing both antistatic characteristics and reflection preventing capability has been proposed.

As an example of such a reflection preventing film, JP-A-9-288202 describes a reflection preventing film made from a high refractive index layer containing metal alkoxide, colloidal metal oxide, and/or a metal halide as major components, a low refractive index layer of an amorphous fluororesin with a refractive index of 1.36 or less formed on the high refractive index layer, and a coating layer containing organic polysiloxane, which contains a fluorine-based surfactant, as a major component formed on the low refractive index layer. JP-A-11-211901 discloses a reflection preventing film made from a low refractive index layer of a fluorine-containing compound with a refractive index of about 1.4 formed on a hard coat layer in which fine particles of metal oxide such as zinc antimonate fine particles are dispersed. JP-A-11-218604 (U.S. Pat. Nos. 6,310,858, 6,383,559) discloses a reflection preventing film made from a low refractive index layer with a refractive index from 1.20 to 1.55 formed on an antistatic layer of a polymer binder having an anionic group in which fine particles of metal oxide such as antimony-doped tin oxide (ATO) and tin-doped indium oxide (ITO) are dispersed.

The reflection preventing films disclosed in these prior art documents, however, do not necessarily satisfy the demanded transparency, mechanical strength, antistaticity, and reflection preventing characteristics. In particular, the addition of metal oxide fine particles unduly impairs transparency of the substrate film, although the antistatic characteristics can be provided.

JP-A-11-72602 discloses a substrate with a reflection preventing layer made from a low refractive index layer of a fluorine-containing polymer with a refractive index of 1.36 or less formed on a thin metal oxide film of antimony pentaoxide fine particles. However, this metal oxide thin film cannot exhibit sufficient strength and hardness. Moreover, the resulting substrate with a reflection preventing layer does not satisfy sufficient reflection preventing performance.

DISCLOSURE OF THE INVENTION

The present invention has been achieved in view of the above problems in the prior art technology and has an object of providing a reflection preventing layered product excelling in transparency, mechanical strength, antistaticity, and reflection preventing characteristics and an optical member using the reflection preventing layered product.

The inventors of the present invention have conducted extensive studies in order to achieve the above objects. As a result, the inventors have found that a reflection preventing layered product obtained by sequentially laminating a high refractive index layer and a low refractive index layer having a low refractive index of a certain range on a transparent plastic film, in which the surface resistance is not more than a specified value and the total light transmittance is not less than a specified value, satisfies all of the characteristics, including transparency, mechanical strength, antistaticity, and reflection preventing performance. The inventors have further found that a polarizing plate having reflection preventing function and excelling in transparency and mechanical strength can be efficiently produced by attaching this reflection preventing layered product to at least one surface of a polarizer. These findings have led to the completion of the present invention.

Accordingly, a first object of the present invention is to provide a reflection preventing layered product comprising a high refractive index layer and a low refractive index layer, which has a refractive index lower than that of the high refractive index layer, laminated in that order on a transparent plastic film directly or through other layer, in which a surface resistance on the surface of the low refractive index layer is $1.0 \times 10^{10}$ ohm/square inch or less, a total light transmittance of 94% or more, and a refractive index of 1.25 to 1.37.

In the reflection preventing layered product of the present invention, the high refractive index layer preferably contains conductive fine particles and at least one of an activated energy ray-curable resin and a heat-curable resin. In this instance, conductive fine particles are preferably fine particles of antimony pentaoxide and/or phosphorus-doped tin oxide.

In the reflection preventing layered product of the present invention, the high refractive index layer preferably has a refractive index of 1.55 or more.

In the reflection preventing layered product of the present invention, the low refractive index layer is preferably made of an aerogel.

A second object of the present invention is to provide an optical member comprising the reflection preventing layered product.

The optical member of the present invention is preferably a polarizing plate with a reflection preventing function in a liquid crystal display.

A third object of the present invention is to provide a liquid crystal display element comprising the polarizing plate with the reflection preventing function of the present invention.

BEST MODE FOR CARRYING OUT THE INVENTION

Figure 1:
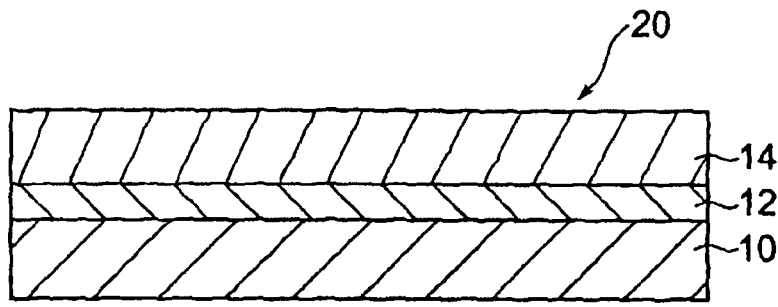
FIG. 1 is a cross-sectional view of a layer configuration of one embodiment of the reflection preventing layered product according to the present invention.

The present invention is described below in detail, in the order of, 1) a reflection preventing layered product, 2) an optical member, and 3) a liquid crystal display element.

1) Reflection Preventing Layered Product

The reflection preventing layered product of the present invention comprises a high refractive index layer and a low refractive index layer, which has a refractive index lower than that of the high refractive index layer, laminated in that order on a transparent plastic film directly or through another layer, in which the low refractive index layer has a surface resistance of $1.0 \times 10^{10}$ ohm/square inch or less, a total light transmittance of 94% or more, and a refractive index of 1.25 to 1.37.

A transparent plastic film is used as a substrate for the reflection preventing layered product of the present invention. The transparent plastic film used in the present invention is not particularly limited insofar as it is a plastic exhibiting excellent transparency. It is preferable that the transparent film be formed of a synthetic polymer exhibiting a total light transmittance of 80% or more, and more preferably 90% or more at a thickness of 1 mm.

As examples of the synthetic polymer which forms the base film, an alicyclic structure-containing polymer, cellulose polymer, polyester-polymer, polycarbonate polymer, polysulfone polymer, polyether sulfone polymer, polystyrene polymer, polyolefin polymer, polyvinyl alcohol polymer, polyvinyl chloride polymer, polymethacrylate polymer, and the like can be given.

These synthetic polymers may be used either individually or in combination of two or more.

Of these, alicyclic structure-containing polymers, cellulose polymers such as cellulose diacetate, cellulose triacetate, and cellulose acetate butyrate, and polyester polymers such as polyethylene terephthalate, polybutylene terephthalate, and polyethylene naphthalate are preferable due to high transparency and absence of optical anisotropy, with alicyclic structure-containing polymers, cellulose triacetate, and polyethylene terephthalate being more preferable from the viewpoint of transparency, dimensional stability, lightweight, and the like. The alicyclic structure-containing polymers are particularly preferable from the viewpoint of low hygroscopic properties and dimensional stability.

The alicyclic structure-containing polymer has an alicyclic structure in the repeating unit of the polymer. Either a polymer having an alicyclic structure in the main chain or a polymer having an alicyclic structure in the side chain may be used as the alicyclic structure-containing polymer.

As examples of the alicyclic structure, a cycloalkane structure, a cycloalkene structure, and the like can be given. Of these, the cycloalkane structure is preferable from the viewpoint of heat stability and the like. The number of carbon atoms of the alicyclic structure is not particularly limited. The number of carbon atoms is usually 4 to 30, preferably 5 to 20, and still more preferably 5 to 15. If the number of carbon atoms of the alicyclic structure is within this range, a base film exhibiting excellent heat resistance and flexibility can be obtained.

The content of the repeating unit having the alicyclic structure in the alicyclic structure-containing polymer may be arbitrarily selected according to the purpose of use. The content is usually 50 wt % or more, preferably 70 wt % or more, and still more preferably 90 wt % or more. If the content of the repeating unit having the alicyclic structure is too low, heat resistance may be decreased. A repeating unit other than the repeating unit having the alicyclic structure in the alicyclic structure-containing polymer is arbitrarily selected according to the purpose of use.

As specific examples of the alicyclic structure-containing polymer, (i) a norbornene polymer, (ii) a monocyclic olefin polymer, (iii) a cyclic conjugated diene polymer, (iv) a vinyl alicyclic hydrocarbon polymer, hydrogenated products of these polymers, and the like can be given. Of these, the norbornene polymer is preferable from the viewpoint of transparency and moldability.

As specific examples of the norbornene polymer, a ring-opening polymer of norbornene monomers, a ring-opening copolymer of a norbornene monomer and a monomer copolymerizable by the ring-opening reaction with the norbornene monomer, hydrogenated products of these polymers, an addition polymer of norbornene monomers, an addition copolymer of a norbornene monomer and a monomer copolymerizable with the norbornene monomer, and the like can be given. Of these, the hydrogenated product of the ring-opening (co) polymer of norbornene monomers is particularly preferable from the viewpoint of transparency.

As examples of the norbornene monomer, bicyclo[2.2.1]hept-2-ene (common name: norbornene), tricyclo[4.3.0.1$^{2,5}$]deca-3,7-diene (common name: dicyclopentadiene), 7,8-benzotricyclo[4.3.0.1$^{2,5}$]dec-3-ene (common name: methanotetrahydrofluorene), tetracyclo[4.4.0.1$^{2,5}$.1$^{7,10}$]dodec-3-ene (common name: tetracyclododecene), derivatives (derivative having a substituent on the ring, for example) of these compounds, and the like can be given. As examples of the substituent, an alkyl group, an alkylene group, an alkoxycarbonyl group, a carboxyl group, and the like can be given. The same or different substituents may be bonded to the ring at the same time. The norbornene monomers may be used either individually or in combination of two or more.

As examples of the monomer which is copolymerizable by the ring-opening reaction with the norbornene monomer, monocyclic olefins such as cyclohexene, cycloheptene, and cyclooctene, and derivatives thereof; cyclic conjugated dienes such as cyclohexadiene and cycloheptadiene, and derivatives thereof; and the like can be given.

The ring-opening polymer of the norbornene monomers and the ring-opening copolymer of the norbornene monomer and the monomer copolymerizable with the norbornene monomer may be obtained by polymerizing the monomers in the presence of a ring-opening polymerization catalyst.

As the ring-opening polymerization catalyst, a known ring-opening polymerization catalyst may be used.

As examples of the monomer which is copolymerizable by the addition polymerization reaction with the norbornene monomer, α-olefins having 2 to 20 carbon atoms such as ethylene and propylene, and derivatives thereof; cycloolefins such as cyclobutene and cyclopentene, and derivatives thereof; nonconjugated dienes such as 1,4-hexadiene; and the like can be given. These monomers may be used either individually or in combination of two or more. Of these; the α-olefins are preferable, with ethylene being still more preferable.

The addition polymer of the norbornene monomers and the addition copolymer of the norbornene monomer and the monomer copolymerizable with the norbornene monomer may be obtained by polymerizing the monomers in the presence of an addition polymerization catalyst. As the addition polymerization catalyst, a known addition polymerization catalyst may be used.

The hydrogenated products of the ring-opening polymer of the norbornene monomers, the ring-opening copolymer of the norbornene monomer and the monomer copolymerizable by the ring-opening reaction with the norbornene monomer, the addition polymer of the norbornene monomers, and the addition polymer of the norbornene monomer and the monomer copolymerizable with the norbornene monomer may be obtained by adding a known hydrogenation catalyst to the unhydrogenated polymer and hydrogenating the carbon-carbon unsaturated bonds in an amount of preferably 90% or more.

As examples of the monocyclic olefin polymer, addition polymers of cyclohexene, cycloheptene, cyclooctene, and the like can be given.

As examples of the cyclic conjugated diene polymer, 1,2-addition or 1,4-addition polymers of cyclic conjugated diene monomers such as cyclopentadiene, cyclohexadiene, and the like can be given.

The vinyl alicyclic hydrocarbon polymer is a polymer having a repeating unit derived from a vinylcycloalkane or vinylcycloalkene. As examples of the vinyl alicyclic hydrocarbon polymer, polymers of vinyl alicyclic hydrocarbon compounds such as a vinylcycloalkane (e.g. vinylcyclohexane) and a vinylcycloalkene (e.g. vinylcyclohexene), and hydrogenated products thereof; aromatic-portion hydrogenated products of polymers of vinyl aromatic hydrocarbon compounds such as styrene and $\alpha$-methylstyrene; and the like can be given.

The vinyl alicyclic hydrocarbon polymer may be a copolymer such as a random copolymer or a block copolymer of a vinyl alicyclic hydrocarbon compound or a vinyl aromatic hydrocarbon compound and a monomer copolymerizable with these monomers and a hydrogenated product of these copolymers. Examples of the block copolymerization include, but are not specifically limited to, diblock, triblock, or higher multiblock copolymerization, gradient block copolymerization, and the like.

The molecular weight of the transparent plastic measured by gel permeation chromatography using cyclohexane (or toluene when the transparent plastic is not dissolved in cyclohexane) as a solvent is usually 10,000 to 300,000, preferably 15,000 to 250,000, and still more preferably 20,000 to 200,000, in terms of a polyisoprene-reduced (when cyclohexane is used as a solvent) or polystyrene-reduced (when toluene is used as a solvent) weight average molecular weight. The molecular weight in this range ensures highly balanced mechanical strength and forming processability of the film.

The glass transition temperature of the transparent plastic may be arbitrarily selected according to the purpose of use. The glass transition temperature is preferably 80° C. or more, and still more preferably 100 to 250° C. The transparent plastic film of which the glass transition temperature is within the above range does not produce deformation and stress during use at a high temperature and a high humidity and exhibits excellent durability.

The molecular weight distribution (weight average molecular weight (Mw)/number average molecular weight (Mn)) of the transparent plastic is not particularly limited, but is usually 1.0 to 10.0, preferably 1.0 to 6.0, and still more preferably 1.1 to 4.0. The mechanical strength and forming processability of the transparent plastic film are well balanced by adjusting the molecular weight distribution in the above range.

The transparent plastic film used as a substrate for the reflection preventing layered product of the present invention can be obtained by the process for producing the above transparent plastic in the shape of a film using a conventional process.

As examples of the process for producing the transparent plastic in the shape of a film, a solution casting method and a melt extrusion forming method (or a melt extrusion molding method) can be given. In particular, the melt extrusion forming method is preferable in order to reduce the content of volatile component in the film and to avoid fluctuation of the film thickness. As examples of the melt extrusion forming method, a method using a die such as a T-shaped die, an inflation method, and the like can be given. Of these, the method using a T-shaped die is preferable due to excellent productivity and thickness accuracy.

When using the method utilizing a T-shaped die as the method for forming a film, the transparent plastic is melted in an extruder having a T-shaped die at a temperature preferably 80 to 180° C., and still more preferably 100 to 150° C. higher than the glass transition temperature of the transparent plastic. If the transparent plastic is melted in an extruder at too low a temperature, the flowability of the transparent plastic may be insufficient. If the transparent plastic is melted in an extruder at too high a temperature, the transparent plastic may deteriorate.

It is preferable to preliminarily dry the transparent plastic before forming into the shape of a film. The transparent plastic is preliminarily dried by, for example, pelletizing the raw material and drying the pellets using a hot air dryer and the like. The drying temperature is preferably 100° C. or more, and the drying time is preferably two hours or more. The amount of volatile component in the film can be reduced by preliminary drying. Moreover, the extruded transparent plastic can be prevented from foaming.

A transparent plastic with saturated water absorption of less than 0.05% is preferably used. Use of a transparent plastic with saturated water absorption of less than 0.05% prevents deterioration of the reflection preventing layered product and a decrease in the productivity during forming due to discharge of moisture. In addition, the laminated layer does not peel off from the transparent plastic film due to expansion or contraction of the film caused by water absorption during use for a long period of time.

The saturated water absorption of the transparent plastic can be measured according to the method of JIS K7209.

A transparent plastic film provided with a surface modification treatment on either one or both sides can be used in the present invention. Adhesion to the high refractive index layer or the like described later can be improved by providing the transparent plastic film with the surface modification treatment.

As examples of the surface modification treatment, an energy ray treatment, chemical treatment, and the like can be given.

As examples of the energy ray treatment, a corona discharge treatment, plasma treatment, electron beam treatment, ultraviolet radiation treatment, and the like can be given. Of these, the corona discharge treatment and the plasma treatment are preferable in view of treatment efficiency and the like. The corona discharge treatment is particularly preferable. As the chemical treatment, the film may be immersed in an oxidizing agent aqueous solution such as a potassium dichromate solution or concentrated sulfuric acid solution, and then sufficiently washed with water. Although shaking during immersion is effective, a long time treatment may dissolve the surface of the film or impair transparency. Therefore, it is necessary to adjust the treatment time and the like according to the reactivity, concentration, and the like of the chemical used.

The thickness of the transparent plastic film is usually 10 to 1000 μm in view of ease of handling and processability. However, the thickness is preferably 30 to 300 μm, and still more preferably 40 to 200 μm from the viewpoint of transparency and mechanical strength.

In the reflection preventing layered product of the present invention, another layer may be provided between the transparent plastic film and the high refractive index layer. As examples of such a layer, a hard coating layer and a primer layer can be given.

The hard coating layer is formed to increase the surface hardness, cycle fatigue resistance, and scratch resistance of the transparent plastic film. Any material having hardness equivalent to or greater than the "HB" hardness in the pencil hardness test according to JIS K5600-5-4 can be used for the hard coating layer without any specific limitations. As examples, organic hard coating materials such as an organic silicone-based material, a melamine-based material, an epoxy-based material, and an acrylic material; inorganic hard coating material such as a silicon dioxide material; and the like can be given. Of these, a polyfunctional acrylate hard coating material is preferable due to superior adhesiveness and excellent productivity.

The method for forming the hard coating layer is not particularly limited. For example, a method of applying a coating liquid for forming the hard coating layer to the base film using a known application method and curing the coating by ultraviolet radiation can be given. Although not specifically limited, the thickness of the hard coating layer is usually 0.5 to 30 μm, and preferably 3 to 15 μm.

A primer layer is formed in order to provide and improve adhesion between the transparent plastic film and the high refractive index layer. As examples of the material for the primer layer, a polyester urethane resin, polyether urethane resin, polyisocyanate resin, polyolefin resin, resin having a hydrocarbon skeleton in the main chain, polyamide resin, acrylic resin, polyester resin, vinyl chloride-vinyl acetate copolymer, chlorinated rubber, cyclized rubber, modified products obtained by introducing a polar group into these polymers, and the like can be given. Of these, a modified product of the resin having a hydrocarbon skeleton in the main chain and a modified cyclized rubber may be suitably used.

As examples of the resin having a hydrocarbon skeleton in the main chain, resins having a polybutadiene skeleton or an at least partially hydrogenated polybutadiene skeleton can be given. As specific examples of such resins, a polybutadiene resin, hydrogenated polybutadiene resin, styrene-butadiene-styrene block copolymer (SBS copolymer), hydrogenated product of the styrene-butadiene-styrene block copolymer (SEBS copolymer), modified products of these resins, and the like can be given. Of these, a modified product of the hydrogenated product of the styrene-butadiene-styrene block copolymer may be suitably used.

The above modified products can be obtained by introducing a polar group. As the compound used for introducing the polar group, a carboxylic acid or its derivative is preferable. As examples of the carboxylic acid and its derivative, unsaturated carboxylic acids such as acrylic acid, methacrylic acid, maleic acid, and fumaric acid; derivatives of the unsaturated carboxylic acid (e.g. halide, amide, imide, anhydride, and ester) such as maleyl chloride, maleimide, maleic anhydride, and citraconic anhydride; and the like can be given. Of these, the modified product of the unsaturated carboxylic acid or the unsaturated carboxylic anhydride may be suitably used due to excellent adhesion. As the unsaturated carboxylic acid or the unsaturated carboxylic anhydride, acrylic acid, methacrylic acid, maleic acid, and maleic anhydride are preferable, with maleic acid and maleic anhydride being still more preferable. The above unsaturated carboxylic acids and the like may be used in combination of two or more or may be modified.

The method for forming the primer layer is not particularly limited. For example, a method of applying a coating liquid for forming the primer layer to the base film using a known application method to form the primer layer can be used. The thickness of the primer layer is not particularly limited and is usually 0.01 to 5 μm, and preferably 0.1 to 2 μm.

Various additives may be optionally added to the materials for the transparent plastic film, hard coating layer, and primer layer. The additive is not particularly limited insofar as it is commonly used in a thermoplastic resin material. As examples of the additive, antioxidants such as a phenol antioxidant, phosphoric acid antioxidant, and sulfur antioxidant; UV absorbers such as a benzotriazole UV absorber, benzoate UV absorber, benzophenone UV absorber, acrylate UV absorber, and metal complex UV absorber; light stabilizers such as a hindered amine light stabilizer; coloring agents such as a dye and pigment; lubricants such as a fatty alcohol ester, polyhydric alcohol ester, fatty acid amide, and inorganic particles; plasticizers such as a triester plasticizer, phthalate plasticizer, fatty acid-base acid ester plasticizer, and oxy acid ester plasticizer; antistatic agents such as a fatty acid ester of a polyhydric alcohol; and the like can be given.

The high refractive index layer of the reflection preventing layered product of the present invention is a layer having a high refractive index as compared with the refractive indices of the transparent plastic film and low refractive index layer laminated on the high refractive index layer.

There are no specific limitations to the material for forming the high refractive index layer insofar as the material has a greater refractive index than the materials for the transparent plastic film, low refractive index layer, and other layers. It is preferable that the material for the high refractive index layer contain a heat-curable resin or an activated energy ray-curable resin (preferably an activated energy ray-curable resin) due to excellent transparency and high mechanical strength.

As examples of the heat-curable resin, a phenol resin, urea resin, diallyl phthalate resin, melamine resin, guanamine resin, unsaturated polyester resin, polyurethane resin, epoxy resin, aminoalkyd resin, melamine-urea cocondensation resin, silicone resin, polysiloxane resin, and the like can be given. In particular, the melamine resin, epoxy resin, silicone resin, and polysiloxane resin are preferable due to excellent surface hardness, cycle fatigue resistance, and scratch resistance.

The above resin may contain a curing agent such as a crosslinking agent and an initiator, polymerization promoter, solvent, viscosity controller, and the like, as required.

The activated energy ray-curable resin is a resin obtained by curing a prepolymer, oligomer, and/or monomer containing a polymerizable unsaturated bond or an epoxy group in the molecule by applying energy rays. The term "activated energy rays" used herein refers to electromagnetic waves or charged particle rays having an energy quantum which can polymerize or crosslink molecules. As the activated energy rays, ultraviolet rays or electron beams are usually used.

As examples of the prepolymer and oligomer containing a polymerizable unsaturated bond or an epoxy group in the molecule, unsaturated polyesters such as a condensate of an unsaturated dicarboxylic acid and a polyhydric alcohol, methacrylates such as polyester methacrylate, polyether methacrylate, polyol methacrylate, and melamine methacrylate, acrylates such as polyester acrylate, epoxy acrylate, urethane acrylate, polyether acrylate, polyol acrylate, and melamine acrylate, and cationically polymerizable epoxy compounds can be given.

As examples of the monomer containing a polymerizable unsaturated bond or an epoxy group in the molecule, styrene monomers such as styrene and α-methylstyrene; acrylates such as methyl acrylate, ethyl acrylate, 2-ethylhexyl acrylate, and methoxyethyl acrylate; methacrylates such as methyl methacrylate, ethyl methacrylate, and propyl methacrylate; unsaturated substituted amino alcohol esters such as 2-(N,N-diethylamino)ethyl acrylate, 2-(N,N-dimethylamino)ethyl acrylate, and 2-(N,N-dibenzylamino)methyl acrylate; unsaturated carboxylic acid amides such as acrylamide and methacrylamide; polyfunctional acrylates such as ethylene glycol diacrylate, propylene glycol diacrylate, neopentyl glycol diacrylate, 1,6-hexanediol diacrylate, trimethylolpropane triacrylate, pentaerythritol triacylate, pentaerythritol tetraacrylate, and dipentaerythritol hexaacrylate; polythiols containing two or more thiol groups in the molecule such as trimethylolpropane trithioglycolate, trimethylolpropane trithiopropylate, and pentaerythritol tetrathioglycolate; and the like can be given. In the present invention, the prepolymer, oligomer, and/or monomer containing a polymerizable unsaturated bond or an epoxy group in the molecule may be used either individually or in combination of two or more.

In the reflection preventing layered product of the present invention, it is preferable that the high refractive index layer contain conductive fine particles in addition to the activated energy ray-curable resin or the heat-curable resin. A high refractive index layer having the function of an antistatic film and exhibiting excellent mechanical strength can be formed by adding the conductive fine particles to the activated energy ray-curable resin or the heat-curable resin.

The conductive fine particles are not particularly limited. It is preferable to use metal oxide fine particles due to excellent transparency.

As examples of the conductive metal oxide for the fine particles, antimony pentoxide, phosphorus-doped tin oxide (PTO), tin oxide, tin-doped indium oxide (ITO), antimony-doped tin oxide (ATO), zinc-doped indium oxide (IZO), aluminum-doped zinc oxide (AZO), fluorine-doped tin oxide (FTO), zinc oxide/aluminum oxide, zinc antimonate, and the like can be given. These metal oxide fine particles may be used either individually or in combination of two or more. In particular, it is preferable to use antimony pentoxide and/or phosphorus-doped tin oxide due to excellent transparency and the like.

In the present invention, conductive metal oxide fine particles obtained by coating metal oxide fine particles which do not exhibit conductivity with a conductive metal oxide to provide the metal oxide fine particles with conductivity may be used. For example, the surfaces of fine particles of titanium oxide, zirconium oxide, cerium oxide, or the like which have a high refractive index and do not exhibit conductivity may be coated with the conductive metal oxide to provide the fine particles with conductivity.

The BET average particle diameter of the metal oxide fine particles is usually 200 nm or less, and preferably 50 nm or less in order to prevent a decrease in the transparency of the high refractive index layer. If the BET average particle diameter is greater than 200 nm, the haze (turbidity) of the high refractive index layer may be increased. The particle diameter may be measured by naked eye observation of a secondary electron emission photograph obtained using a scanning electron microscope (SEM) or the like, or using a particle size distribution meter utilizing dynamic light scattering, static light scattering, or the like.

The high refractive index layer comprising conductive fine particles and an activated energy ray-curable resin or a heat-curable resin can be formed by applying a composition for the high refractive index layer which contains the above-mentioned conductive fine particles, the above-mentioned prepolymers, oligomers and/or monomers, and a suitable solvent onto the above-mentioned transparent plastic film or another layer formed on the surface of the transparent plastic film, and irradiating the coated layer with an activated energy ray (in the case in which an activated energy ray-curable resin is contained) or heating the coated layer (in the case in which a heat-curable resin is contained).

The composition for forming the high refractive index layer can be prepared by dispersing or dissolving the above-mentioned conductive fine particles and the above-mentioned prepolymers, oligomers and/or monomers having a polymerizable unsaturated bond or an epoxy group in the molecule in a suitable organic solvent.

As examples of the organic solvent used to prepare the coating liquid, alcohols such as methanol, ethanol, isopropanol, and n-butanol; glycols such as ethylene glycol, ethylene glycol monobutyl ether, ethylene glycol monoethyl ether acetate, diethylene glycol, diethylene glycol monobutyl ether, and diacetone glycol; aromatic hydrocarbons such as toluene and xylene; aliphatic hydrocarbons such as n-hexane and n-heptane; esters such as ethyl acetate and butyl acetate; ketones such as methyl ethyl ketone and methyl isobutyl ketone; oximes such as methyl ethyl ketoxime; a combination of two or more of these solvents; and the like can be given.

The content of the prepolymers, oligomers, and/or monomers in the composition for forming the high refractive index layer is not particularly limited. It is preferable that the composition contains the prepolymers, oligomers, and/or monomers in an amount of 5 to 95 wt % in order to obtain excellent applicability.

Although there are no specific limitations to the content of the conductive fine particles in the composition for forming the high refractive index layer, the content of the conductive fine particles in the total solid components of the high refractive index layer is preferably 30 vol % or more, and still more preferably 40 to 70 vol %. If the content of the conductive fine particles is less than 30 vol %, the antistatic properties of the resulting reflection preventing layered product is decreased.

When curing the composition for the high refractive index layer by applying ultraviolet rays, a photoinitiator or a photopolymerization promoter is added to the composition. As examples of the photoinitiator, radical polymerization initiators such as an acetophenone, benzophenone, thioxanthone, benzoin, and benzoin methyl ether; cationic polymerization initiators such as an aromatic diazonium salt, aromatic sulfonium salt, aromatic iodonium salt, metallocene compound, and benzoin sulfonate; and the like can be given. These photoinitiators may be used either individually or in combination of two or more.

The amount of the photoinitiator to be added is usually 0.1 to 10 parts by weight for 100 parts by weight of the composition for forming the high refractive index layer. n-butylamine, triethylamine, tri-n-butylphosphine, or the like may be mixed in the composition as a photosensitizer.

A reactive organic silicon compound may further be added to the composition for forming the high refractive index layer. As examples of the organic reactive silicon compound, organosilicon compounds shown by the formula: $R_mSi(OR')_n$ (wherein R represents a hydrogen atom or an alkyl group having 1 to 10 carbon atoms, and R' represents an alkyl group having 1 to 10 carbon atoms, and m and n individually represent positive integers satisfying the relationship "m+n=4"), such as tetramethoxysilane, tetraethoxysilane, tetraisopropoxysilane, tetra-n-propoxysilane, tetra-n-butoxysilane, tetra-sec-butoxysilane, tetra-tert-butoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, and methyldiethoxysilane; silane coupling agents such as γ-(2-aminoethyl)aminopropyltrimethoxysilane, γ-(2-aminoethyl)aminopropylmethyldimethoxysilane, β-(3,4-epoxycyclohexyl)ethyltrimethoxysilane, γ-aminopropyltriethoxysilane, γ-methacryloxypropylmethoxysilane, γ-glycidoxypropyltrimethoxysilane, vinyltriacetoxysilane, γ-mercaptopropyltrimethoxysilane, γ-chloropropyltrimethoxysilane, hexamethyldisilazane, vinyltris(β-methoxyethoxy)silane, and the like; activated energy ray-curable silicon compounds such as a polysilane substituted with a vinyl group at one terminal, a polysilane substituted with vinyl groups at both terminals, a polysiloxane substituted with a vinyl group at one terminal, a polysiloxane substituted with vinyl groups at both terminals, and a vinyl-group-substituted polysilane or a vinyl-group-substituted polysiloxane obtained by reacting these compounds; other organosilicon compounds such as (meth)acryloxysilane compounds such as 3-(meth)acryloxypropyltrimethoxysilane and 3-(meth)acryloxypropylmethyldimethoxysilane; and the like can be given.

A leveling agent or a dispersant may be added to the composition for forming the high refractive index layer as appropriate in order to improve the uniformity and adhesion of the coating and the like. As examples of the leveling agent, compounds which decrease surface tension such as silicone oil, fluorinated polyolefin, and polyacrylate can be given. As examples of the dispersant, a surfactant, silane coupling agent, and the like can be given.

Particles which provide antiglare properties may be added to the composition for forming the high refractive index layer in order to provide antiglare properties. The particles which provide antiglare properties are not particularly limited insofar as irregularities are formed on the surface of the antiglare layer. In order to effectively form irregularities on the surface of the antiglare layer, the average particle diameter of the particles which provide antiglare properties is preferably 0.5 to 10 μm, and still more preferably 1 to 7 μm.

As the material for the particles for providing antiglare properties, particles of resins such as polymethylmethacrylate resin, fluororesin, vinylidene fluoride resin, silicone resin, epoxy resin, Nylon, polystyrene resin, phenol resin, polyurethane resin, cross-linking acrylic resin, cross-linking polystyrene resin, melamine resin, and benzoguanamine resin, and inorganic particles such as $TiO_2$, $Al_2O_3$, $In_2O_3$, ZnO, $SnO_2$, $Sb_2O_3$, $ZrO_2$, ITO, $MgF_2$, $SiO_2$, aluminosilicate, and the like can be given.

A known coating method can be used without any specific limitations for applying the composition for forming the high refractive index layer to the transparent plastic film. As examples of the coating method, wire bar coating, dipping, spraying, spin coating, roll coating, and the like can be given.

After application of the composition for forming the high refractive index layer, the coating is dried and heated in the case in which the composition contains a heat-curable resin, or irradiated with activated energy rays in the case in which the composition contains an activated energy ray-curable resin, thereby curing the coating to obtain the high refractive index layer.

The heating temperature, the heating time, the dose and irradiation time of the activated energy rays, and the like are not particularly limited. The curing conditions may be appropriately set according to the formulation and the like of the composition of curable resin.

The thickness of the high refractive index layer is usually 0.5 to 30 μm, and preferably 1 to 10 μm. If the thickness is less than 0.5 μm, the hardness and the mechanical strength of the high refractive index layer may be decreased. If greater than 30 μm, the thickness may become uneven when applying the composition for forming the high refractive index layer, whereby the processability may be decreased.

The refractive index of the high refractive index layer is preferably 1.55 or more, and still more preferably 1.60 or more. The refractive index may be measured using a known spectroscopic ellipsometer, for example.

When the high refractive index layer contains conductive fine particles, the high refractive index layer has an antistatic function. The surface resistance of the high refractive index layer having an antistatic function is preferably $1.0 \times 10^{10}$ ohm/square inch or less, and still more preferably $5.0 \times 10^9$ ohm/square inch or less.

The surface resistance may be measured using a resistivity meter.

The refractive index of the low refractive index layer of the reflection preventing layered product of the present invention is from 1.25 to 1.37. The refractive index can be measured using a known spectroscopic ellipsometer.

The low refractive index layer can be formed by (I) a method of applying a coating liquid containing a resin having a refractive index of the above range on a high refractive index layer and drying the coating, (II) a method of attaching a film of the resin having a refractive index of the above range on a high refractive index layer, (III) a method of applying a coating liquid containing a polymerizable or curable compound that can form a low refractive index layer satisfying the above refractive index requirement on a high refractive index layer, and drying the coating, followed by polymerization or curing.

Of these, the method (III) is preferable due the capability of easily forming the target low refractive index layer.

As a resin having a low refractive index used in the above methods (I) and (II), a fluororesin obtained from a fluorine atom-containing monomer, for example, can be given. As specific examples, polytetrafluoroethylene, polyvinylidenefluoride, tetrafluoroethylene-ethylene copolymer, perfluoropolyether, and the like can be given.

As examples of a polymerizable or curable compound that can form a low refractive index layer satisfying the above refractive index requirement used in the above method (III), (a) an organic compound having a polymerizable functional group in the molecule, (b) a compound producing a metal oxide by a sol-gel process, and the like can be given. The compound (b) producing a metal oxide by a sol-gel process is more preferable.

As specific examples of an organic compound (a) having a polymerizable functional group in the molecule, (meth)acrylate compounds such as 2-(perfluorobutyl)ethyl acrylate, 2-(perfluorooctyl)ethyl acrylate, 2-(perfluorobutyl)ethyl methacrylate, and 2-(perfluorooctyl)ethyl methacrylate; alkoxysilane compounds such as tetramethoxysilane, tetraethoxysilane, methyltrimethoxysilane, phenyltrimethoxysilane, phenyltriethoxysilane, dimethyldimethoxysilane, dimethyldiethoxysilane, vinyltrimethoxysilane, vinyltriethoxysilane, γ-aminopropyltriethoxysilane, N—(β- aminoethyl)-γ-aminopropyltrimethoxysilane, N—(β-aminoethyl)-γ-aminopropylmethyldimethoxysilane, γ-mercaptopropyltrimethoxysilane, γ-mercaptopropylmethyldimethoxysilane, γ-methacryloyloxypropyltrimethoxysilane, γ-methacryloyloxypropylmethyldimethoxysilane, γ-glycidoxypropyltrimethoxysilane, and γ-glycidoxypropylmethyldimethoxysilane; halogenated silane compounds such as tetrachlorosilane and methyltrichlorosilane; silazane compounds such as hexamethyldisilazane; fluorine-containing alkoxysilane compounds such as 2-(perfluorooctyl)ethyltrimethoxysilane and 2-(perfluoropropyl)ethyltrimethoxysilane; and the like can be given.

These compounds may be used either individually or in combination of two or more.

At least one compound selected from the group consisting of the following groups (α) to (γ) can be given as a compound producing a metal oxide compound by the sol-gel reaction of the above coating liquid (b).

(α) A compound shown by the formula (1): $MX_n$ (β) A partial hydrolysate of at least one compound shown by the formula (1)

(γ) A complete hydrolysate of at least one compound shown by the formula (1)

In the compound (α) shown by the formula (1), M represents a metal atom or a semimetal atom.

As examples of the metal atom or the semimetal atom, alkali metals such as lithium, sodium, and potassium; alkaline earth metals such as magnesium, calcium, barium, and strontium; group 3B elements of the periodic table such as boron, aluminum, gallium, indium, and thallium; group 4B elements of the periodic table such as silicon, germanium, tin, and lead; group 5B elements of the periodic table such as phosphorus, arsenic, and antimony; transition metal elements such as scandium, titanium, vanadium, iron, nickel, copper, zinc, yttrium, zirconium, niobium, tantalum, and tungsten; lanthanoids such as lanthanum, cerium, and neodymium; and the like can be given. Of these, the group 3B elements, group 4B elements, and transition metal elements are preferable. Aluminum, silicon, titanium, and zirconium are more preferable, with silicon being still more preferable.

X represents a halogen atom such as a fluorine atom, a chlorine atom, or a bromine atom; a monovalent hydrocarbon group which may have a substituent; an oxygen atom; an organic acid ion such as an acetic acid ion or a nitric acid ion; a β-diketonate group such as acetylacetonate; an inorganic acid ion such as a nitric acid ion or a sulfuric acid ion; an alkoxy group such as a methoxy group, ethoxy group, n-propoxy group, or n-butoxy group; or a hydroxyl group.

n represents the valence of M (metal atom or semimetal atom). When n is two or more, the Xs may be the same or different.

As specific examples of the compounds shown by the above formula (1), alkoxysilanes, acetoxysilanes, oximesilanes, enoxysilanes, aminosilanes, aminoxysilanes, amidesilanes, and the like can be given.

The partial hydrolysate of at least one compound shown by the formula (1) of (β) (hereinafter referred to as "compound (3)") and the complete hydrolysate of at least one compound shown by the formula (1) of (γ) (hereinafter referred to as "compound (4)") can be obtained by completely or partially hydrolyzing and condensing one or more compounds shown by the above formula (1).

The compound (3) and the compound (4) may be obtained by, for example, hydrolyzing a metal tetraalkoxide shown by $M(Or)_4$ (M is the same as defined above, and r represents a monovalent hydrocarbon group) in the presence of water in such an amount that the molar ratio "$[H_2O]/[Or]$" is 1.0 or more, for example, 1.0 to 5.0, and preferably 1.0 to 3.0.

The hydrolysis may be effected by stirring the mixture at a temperature of 5 to 100° C. for 2 to 100 hours.

When hydrolyzing the compound shown by the formula (1), a catalyst may be used, as required. As the catalyst, either an acid catalyst or a base catalyst may be used.

The acid catalyst is not particularly limited, for example, organic acids such as acetic acid, chloroacetic acid, citric acid, benzoic acid, dimethylmalonic acid, formic acid, propionic acid, glutaric acid, glycolic acid, maleic acid, malonic acid, toluenesulfonic acid, and oxalic acid; inorganic acids such as hydrochloric acid, nitric acid, and halogenated silane; and acidic sol fillers such as acidic colloidal silica and titania oxide sol can be given. These acid catalysts may be used either individually or in combination of two or more.

As the base catalyst, an aqueous solution of a hydroxide of an alkali metal or an alkaline earth metal such as sodium hydroxide, calcium hydroxide, or the like, aqueous ammonia, an aqueous solution of an amine, and the like can be given. These base catalysts may be used either individually or in combination of two or more.

The sol-gel process is a method for obtaining a metal oxide by a hydrolysis-polycondensation reaction of a sol of a metal alkoxide forming a gel which no longer has flowability, and heating the gel.

More specifically, the metal oxide film can be formed by applying a coating liquid containing at least one compound selected from the group consisting of (α) to (γ) to the high refractive index layer and optionally drying and heating the coating.

The method of applying the coating liquid is not particularly limited. A known coating method may be used. As examples of the coating method, wire bar coating, dipping, spraying, spin coating, roll coating, and the like can be given.

The temperature for the optional heating is usually 50 to 200° C., and preferably 80 to 150° C.

As the low refractive index layer used for the method (III) in the present invention, a layer of an aerogel is preferable. An aerogel is a transparent porous material made from a matrix and minute bubbles dispersed in the matrix. Most bubbles have a size of 200 nm or less and the bubbles contained in the porous material usually amount to 10 to 60 vol %, and preferably 20 to 40 vol %. As specific examples of the aerogel in which minute bubbles are dispersed, silica aerogel and a porous body comprising a matrix in which hollow particles are dispersed can be given.

A wet sol for obtaining a silica aerogel can be obtain by hydrolysis and the polymerization reaction of an alkoxysilane (also called "silicon alkoxide" or "alkyl silicate") as described in U.S. Pat. Nos. 4,402,827, 4,432,956, and 4,610, 863, for example.

The wet gel obtained by hydrolysis and the polymerization reaction of an alkoxysilane is preferably made hydrophobic by a hydrophobizing treatment. Since hydrophobic silica aerogel provided with hydrophobicity has improved water resistance by which moisture, water, and the like invade only with difficulty, the hydrophobizing treatment can prevent degradation of performance of silica aerogel such as refractive index, light transmittance, and the like.

The hydrophobizing treatment can be carried out before or during super critical drying of a gel-like compound. In the hydrophobizing treatment, hydroxyl groups in silanol groups which are present on the surface of a gel-like compound react with functional groups of a hydrophobizing agent and are replaced by the hydrophobic groups.

As a method for the hydrophobizing treatment, a method of causing a hydrophobizing agent to permeate a gel-like compound by immersing the gel-like compound in a solution of the hydrophobizing agent or mixing with the hydrophobizing agent and optionally heating the mixture to effect a hydrophobizing reaction can be given, for example (see JP-A-5-279011 and JP-A-7-138375).

As the hydrophobizing agent, for example, hexamethyldisilazane, hexamethyldisiloxane, trimethylmethoxysilane, dimethyldimethoxysilane, methyltrimethoxysilane, ethyltrimethoxysilane, trimethylethoxysilane, dimethyldiethoxysilane, methyltriethoxysilane, and the like can be used.

As the solvent, a medium that can easily dissolve the hydrophobizing agent, can replace the solvent contained in the gel-like compound before the hydrophobizing treatment, and can be easily dried by a super critical drying process is preferably used. As specific examples, alcoholic solvents such as methanol, ethanol, and isopropanol; aromatic hydrocarbon solvents such as xylene, toluene, and benzene; amide solvents such as N,N-dimethylformamide; siloxane solvents such as hexamethyldisiloxane; liquefied carbon dioxide; and the like can be given.

Specifically, the low refractive index layer of an aerogel can be formed by applying a coating liquid of wet gel of a metal oxide obtained by a sol-gel process using a base catalyst or an acid catalyst, or a wet gel treated by the above hydrophobizing treatment onto a high refractive index layer, followed by a critical drying treatment. The method of applying the coating liquid is not particularly limited. A known coating method may be used.

The super critical drying can be carried out, for example, by immersing the above-mentioned gel-like compound in liquefied carbon dioxide to replace all or a part of the solvent contained in the gel-like compound with the liquefied carbon dioxide, of which the critical point is lower than the critical point of the solvent, and drying the gel-like compound under super critical conditions of the carbon dioxide system or the mixed system of carbon dioxide and the solvent.

As the porous material comprising a matrix and hollow particles dispersed in the matrix, a porous material obtained by dispersing hollow fine particles having voids in the inside of fine particles in the above-mentioned resin or above-mentioned coating liquid and polymerizing or curing the dispersion described in JP-A-2001-233611 and JP-A-2003-149642 can be given.

In the present invention, when a porous material comprising a matrix in which hollow particles are dispersed is used as a low refractive index layer, a fluororesin may be mixed with the above-mentioned resin in order to improve the reflective characteristics and antifouling properties of the low refractive index layer.

Any fluorine-containing polymers which are non-crystalline and substantially free from crystal dispersion of light can be used as the fluororesin without specific limitations. For example, a non-crystalline fluoroolefin copolymer such as a terpolymer of tetrafluoroethylene/vinylidene fluoride/hexafluoropropylene (at a wt % ratio of 37-48/15-35/26-44) and a polymer having a fluorine-containing alicyclic structure are suitably used due to the excellent mechanical properties.

Although fine particles of any inorganic compound can be used as the hollow fine particles in the present invention, hollow inorganic fine particles in which cavities are formed inside the shell are preferable, with hollow fine particles of silica being particularly preferable.

As the inorganic compound, an inorganic oxide is generally used. As examples of the inorganic oxide, at least one inorganic oxide such as $SiO_2$, $Al_2O_3$, $B_2O_3$, $TiO_2$, $ZrO_2$, $SnO_2$, $Ce_2O_3$, $P_2O_5$, $Sb_2O_3$, $MoO_3$, $ZnO_2$, and $WO_3$ can be given. As examples of combinations of two or more inorganic oxides, $TiO_2$—$Al_2O_3$, $TiO_2$—$ZrO_2$, $In_2O_3$—$SnO_2$, and $Sb_2O_3$—$SnO_2$ can be given. These inorganic oxides may be used either individually or in combination of two or more.

As the hollow inorganic fine particles, hollow inorganic fine particles having (A) an inorganic oxide single layer, (B) a single layer of a complex oxide formed of different inorganic oxides, or (C) a double layer formed of (A) and (B) may be used.

The hollow fine particle may have a porous shell having pores, or may be a particle in which pores are closed so that the cavity is completely enclosed by the shell. It is preferable that the shell include a plurality of inorganic oxide coating layers formed of an inner first inorganic oxide coating layer and an outer second inorganic oxide coating layer. An inorganic hollow fine particle in which the shell is densified by closing the pores of the shell or the inner cavity is completely enclosed by the shell may be obtained by forming the outer second inorganic oxide coating layer.

In particular, when forming the second inorganic oxide coating layer using a fluorine-containing organic silicon compound, since a coating layer containing a fluorine atom is formed, the resulting particles have a lower refractive index and exhibit excellent dispersibility in an organic solvent. Moreover, the low refractive index layer can be provided with stainproof properties.

As specific examples of the fluorine-containing organic silicon compound, 3,3,3-trifluoropropyltrimethoxysilane, methyl-3,3,3-trifluoropropyldimethoxysilane, heptadecafluorodecylmethyldimethoxysilane, heptadecafluorodecyltrichlorosilane, heptadecafluorodecyltrimethoxysilane, trifluoropropyltrimethoxysilane, tridecafluorooctyltrimethoxysilane, and the like can be given.

The thickness of the shell is usually 1 to 50 nm, and preferably 5 to 20 nm. If the thickness of the shell is less than 1 nm, the inorganic hollow fine particles may not maintain a specific particle shape. If the thickness of the shell is greater than 50 nm, the cavity in the inorganic hollow fine particle is decreased, whereby the refractive index may be insufficiently decreased. It is preferable that the thickness of the shell be 1/50 to 1/5 of the average particle diameter of the inorganic hollow fine particles.

When forming the first inorganic oxide coating layer and the second inorganic oxide coating layer as the shell, the total thickness of these layers may be set in the above range (1 to 50 nm). In particular, when forming a densified shell, the thickness of the second inorganic oxide coating layer is preferably 20 to 40 nm.

A solvent used when preparing the inorganic hollow fine particles and/or gas which enters during drying may exist in the cavity, or a precursor substance described later for forming the cavity may remain in the cavity.

The remaining precursor substance is a porous material which remains after removing part of the component of the core particle from the core particle enclosed by the shell. As the core particle, a porous complex oxide particle formed of different inorganic oxides is used. The precursor substance may adhere to the shell and remain in only a small amount, or may account for the majority of the cavity.

The above solvent or gas may exist in the pores in the porous material. The volume of the cavities increases as the amount of the component of the core particle removed increases, whereby inorganic hollow fine particles with a low refractive index can be obtained. A transparent coating obtained by using the resulting inorganic hollow fine particles has a low refractive index and exhibits excellent reflection preventing properties.

The average particle diameter of the inorganic hollow fine particles is preferably 5 to 2000 nm, and still more preferably 20 to 100 nm, although the average particle diameter is not particularly limited. If the average particle diameter is less than 5 nm, the effect of decreasing the refractive index due to the hollow shape may be reduced. If the average particle diameter is greater than 2000 nm, the transparency is decreased to a large extent, whereby the effect of diffuse reflection may be increased. The average particle diameter used herein is the number average particle diameter measured using a transmission electron microscope.

The method of manufacturing the inorganic hollow fine particles as described above is disclosed in detail in JP-A-2001-233611, for example. The inorganic hollow fine particles used in the present invention may be manufactured based on the method disclosed in JP-A-2001-233611. Or, commercially available inorganic hollow fine particles may also be used.

The inorganic fine particles are preferably used in an amount of 10 to 30 wt % of the entire low refractive index layer, although the amount is not particularly limited. If the amount of the inorganic fine particles is in this range, a low refractive index layer exhibiting a low refractive index and excellent scratch resistance can be obtained.

The inorganic fine particles may also be used in the form of a liquid dispersion. As examples of the organic solvent used for the liquid dispersion, although it is not particularly limited, lower aliphatic alcohols such as methanol, ethanol, isopropanol, n-butanol, and isobutanol; ethylene glycol derivatives such as ethylene glycol, ethylene glycol monobutyl ether, and ethylene glycol monoethyl ether acetate; diethylene glycol derivatives such as diethylene glycol and diethylene glycol monobutyl ether; diacetone alcohol; aromatic hydrocarbons such as toluene and xylene; aliphatic hydrocarbons such as n-hexane and n-heptane; esters such as ethyl acetate and butyl acetate; ketones such as acetone, methyl ethyl ketone, and methyl isobutyl ketone; and the like can be given. These organic solvents may be used either individually or in combination of two or more.

The thickness of the resulting low refractive index layer is usually 10 to 1000 nm, and preferably 30 to 500 nm.

The refractive index of the low refractive index layer is 1.37 or less, preferably 1.26 to 1.37, and particularly preferably 1.30 to 1.36. If the refractive index of the low refractive index layer is less than 1.25, the strength of the low refractive index layer may be low, whereby the mechanical strength required for the polarizing plate protective film may not be obtained. If the refractive index of the low refractive index layer is greater than 1.37, desired reflection preventing effects may not be obtained.

The refractive index of the low refractive index layer consisting of an aerogel can be freely adjusted by changing the compounding ratio of the raw material of the aerogel.

The refractive index may be measured using a known spectroscopic ellipsometer, for example.

The reflection preventing layered product of the present invention may be further provided with a stainproof layer on the low refractive index layer to protect the low refractive index layer and increase the stainproof properties.

The material for forming the stainproof layer is not particularly limited insofar as the function of the low refractive index layer is not hindered and the performance required for the stainproof layer is satisfied. A compound having a hydrophobic group may be preferably used.

As specific examples of the material for forming a stainproof layer, a perfluoroalkylsilane compound, perfluoropolyether silane compound, and fluorine-containing silicone compound can be given. As the method for forming the stainproof layer, physical vapor deposition such as vapor deposition or sputtering; chemical vapor deposition (CVD); wet coating; or the like may be used according to the material for forming a stainproof layer.

Although not particularly limited, the thickness of the stainproof layer is usually 20 nm or less, and preferably 1 to 10 nm.

The surface resistance of the reflection preventing layered product of the present invention (i.e. the surface resistance of the low refractive index layer) is preferably $1.0 \times 10^{10}$ ohm/square inch or less, and still more preferably $5.0 \times 10^9$ ohm/square inch or less. The reflection preventing layered product having the surface resistance in this range excels in antistaticity and dust-rejecting properties.

The total light transmittance of the reflection preventing layered product of the present invention is usually 94% or more, and preferably 95% or more. The total light transmittance can be measured using a haze meter according to JIS K7361-1 (ISO13468-1).

The light reflectance at a wavelength of 550 nm of the reflection preventing layered product of the present invention is usually 0.7% or less, and preferably 0.5% or less. Excellent reflection preventing capability and visibility of the reflection preventing layered product can be confirmed. The light reflectance at a wavelength of 430 nm to 700 nm is preferably 1.2% or less. The light reflectance can be measured using an ultraviolet/visible/near-infrared spectrophotometer.

The reflection preventing layered product of the present invention excels in mechanical strength. When subjected to a steel wool test which consists of rubbing the surface of the low refractive index layer with steel wool back and forth ten times at a load of 0.025 MPa, a preferable reflection preventing layered product of the present invention has absolutely no scratches on the surface in naked eye observation.

FIG. 1 is a view showing one example of the layer configuration of the reflection preventing layered product of the present invention. A reflection preventing layered product 20 shown in FIG. 1 has a high refractive index layer 12 formed on a transparent plastic film 10 and a low refractive index layer 14 laminated on the high refractive index layer 12. The structure of the reflection preventing layered product of the present invention is not limited to that shown in FIG. 1 inasmuch as it includes any structure having a high refractive index layer and a low refractive index layer laminated in that order on a transparent plastic film.

The reflection preventing layered product of the present invention excels in transparency and mechanical strength, has outstanding antistatic characteristics and reflection preventing capability, and is useful as a reflective prevention film for a flat panel. More specifically, the reflection preventing layered product of the present invention is useful as a reflection preventing film for a liquid crystal display device such as a portable telephone, digital information terminal, Pocket Bell (registered trademark), navigation system, onboard liquid crystal display, liquid crystal monitor, modulated light panel, display for office automation (OA) instruments, and display for audio-visual (AV) instruments; electroluminescence display elements; a touch panel; and the like.

2) Optical Member

The optical member of the present invention includes the reflection preventing layered product according to the present invention.

As examples of the optical member, a reflection preventing film of a touch panel, a front board of a plasma display panel in a plasma display panel, and a polarizing plate with a reflection preventing function in a liquid crystal display apparatus can be given. Of these, a polarizing plate with a reflection preventing function in a liquid crystal display apparatus is preferable.

At the present, about 90 percent of touch panels employ the resistance membrane system. A touch panel of the resistance membrane system generally has a structure in which an input side plastic substrate with a transparent conductive thin film such as an indium tin oxide (ITO) film laminated on one side of a transparent plastic substrate and a pressure-receiving side transparent substrate with a transparent conductive thin film such as an ITO film laminated on one side of a transparent substrate such as a glass substrate are placed face to face via an insulating spacer.

In order to input, an input screen of the input side plastic substrate (the side opposing to the transparent conductive film) is pressed with a pen or finger to cause the transparent conductive thin film on the input side plastic substrate to come into contact with the transparent conductive thin film of the pressure-receiving side transparent substrate.

When the reflection preventing layered product of the present invention is used as a reflection preventing film for a touch panel, the reflection preventing layered product may be provided on the visible uppermost surface of the touch panel in the manner in which one side of the transparent plastic film provided with the high refractive index layer and low refractive index layer is viewer's side. Alternatively, a transparent plastic film provided with a transparent conductive thin film such as an ITO film on the surface opposite to the surface on which the high refractive index layer and low refractive index layer are provided may be used as an input side plastic substrate of the touch panel.

When the reflection preventing layered product of the present invention is used as a front board of a plasma display panel, the reflection preventing layered product of the present invention may be used by being laminated on one side or both sides of a transparent substrate in such a manner that the surface on which the high refractive index layer and low refractive index layer of the transparent plastic film is provided is a visible side.

A glass substrate or a transparent resin substrate can be used without specific limitations as a transparent substrate inasmuch as that substrate is transparent.

The reflection preventing layered product and the transparent substrate may be attached to each other by using an appropriate means such as an adhesive or a pressure-sensitive adhesive. As examples of the adhesive or a pressure-sensitive adhesive, acrylic, silicone, polyester, polyurethane, polyether, or rubber adhesive or pressure-sensitive adhesive can be given. Of these, the acrylic adhesive or pressure-sensitive adhesive is preferable due to excellent heat resistance and transparency.

Although the polarizing plate in a liquid crystal display may be provided on the emitting side of the liquid crystal cell, the polarizing plate is usually provided also on the incidence side. This polarizing plate can be produced by dying a substrate film, which is generally made of polyvinyl alcohol, with a two-color dye such as an iodine or organic dye, or causing such a dye to be adsorbed in the substrate film, followed by drawing for orientation in one direction to obtain a polarizer, and attaching a protective film, such as a triacetylcellulose (TAC) film, to both sides of the polarizer.

When the reflection preventing layered product of the present invention is used as a polarizing plate of a liquid crystal display, the polarizer is laminated on one side of the transparent plastic film of the reflection preventing layered product on which the high refractive index layer and low refractive index layer are not provided and a protective film is laminated on the opposite side of the polarizer.

Lamination of the reflection preventing layered product with a polarizer and lamination of the polarizer with a protective film can be carried out using an appropriate bonding means such as an adhesive or a pressure-sensitive adhesive.

As examples of the adhesive or a pressure-sensitive adhesive, acrylic, silicone, polyester, polyurethane, polyether, or rubber adhesive or pressure-sensitive adhesive can be given. Of these, the acrylic adhesive or pressure-sensitive adhesive is preferable due to excellent heat resistance and transparency.

As the protective film, a protective film formed of a material exhibiting low optical anisotropy is preferable. Although there are no specific limitations to the material exhibiting low optical anisotropy, cellulose-based polymers such as cellulose triacetate and alicyclic structure-containing polymers are preferable from the viewpoint of transparency, low birefringence, and dimensional stability. The alicyclic structure-containing polymers are particularly preferable. The protective film may also serve as the phase difference film.

Figure 2:
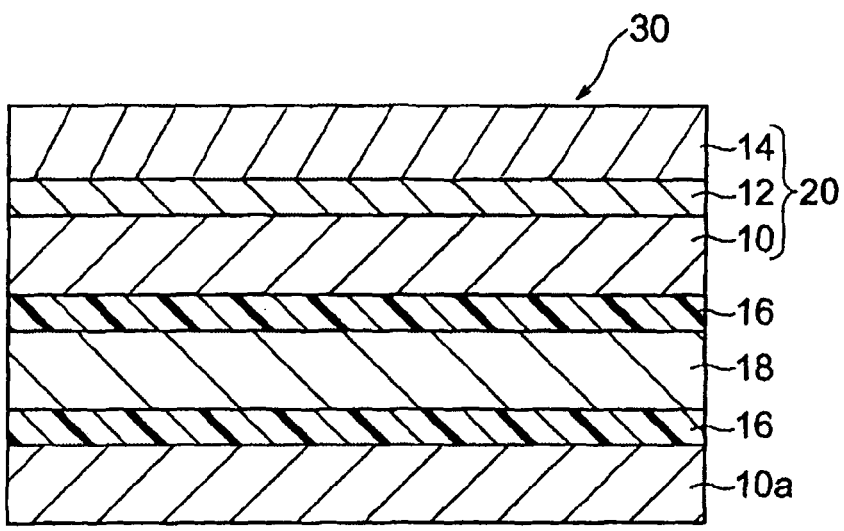
FIG. 2 is a cross-sectional view of a layer configuration of one embodiment of the polarizing plate with a reflection preventing function equipped with the reflection preventing layered product of the present invention.

FIG. 2 is a cross-sectional view showing one example of the layer configuration of a polarizing plate with a reflection preventing function. A polarizing plate with a reflection preventing function 30 shown in FIG. 2 has a structure in which a polarizer 18 is stacked on the reflection preventing layered product 20 of the present invention through an adhesive or pressure-sensitive adhesive layer 16 on the side on which the high refractive index layer 12 and the low refractive index layer 14 are not formed, and a protective film 10a is further stacked on the polarizer 18 through an adhesive or pressure-sensitive adhesive layer 16.

The optical member of the present invention possesses excellent reflection preventing capability, antistatic characteristics, mechanical strength, and productivity due to the use of the reflection preventing layered product of the present invention.

3) Liquid Crystal Display Element

Figure 3:
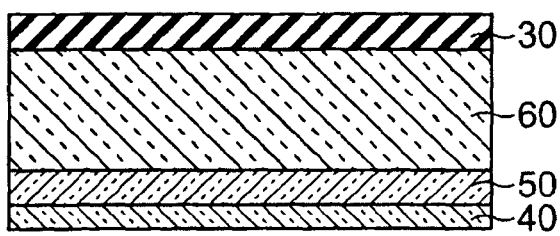
FIG. 3 is a cross-sectional view of a layer configuration of one embodiment of the liquid crystal display element reflection of the present invention.
Figure 4:
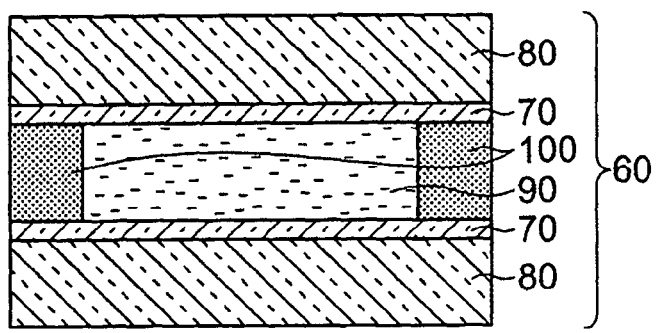
FIG. 4 is a cross-sectional view of the layer configuration of the liquid crystal cell shown in FIG. 3.

The liquid crystal display element of the present invention includes a polarizing plate with a reflection preventing function in which the reflection preventing layered product of the present invention is used. FIG. 3 is a cross-sectional view showing one example of the layer configuration of the liquid crystal display element of the present invention. The liquid crystal display element shown in FIG. 3 includes, from the bottom, a polarizing plate 40, a phase difference plate 50, a liquid crystal cell 60, and the polarizing plate with reflection preventing function 30 in which the reflection preventing layered product of the present invention is used. The polarizing plate with reflection preventing function 30 is bonded to the liquid crystal cell 60 through an adhesive or pressure-sensitive adhesive layer (not shown). As shown in FIG. 4, the liquid crystal cell 60 is formed by disposing two electrode substrates 80, each having a transparent electrode 70, at a specific interval in a state in which the transparent electrodes 70 face each other, and filling the space between the transparent electrodes 70 with a liquid crystal 90, for example. In FIG. 4, a reference numeral 100 indicates a seal.

The liquid crystal mode of the liquid crystal 90 is not particularly limited. As examples of the liquid crystal mode, twisted nematic (TN), super twisted nematic (STN), hybrid alignment nematic (HAN), vertical alignment (VA), multiple vertical alignment (MVA), in-plane switching (IPS), optical compensated bend (OCB), and the like can be given.

The liquid crystal display element shown in FIG. 3 may be used in a normally white mode in which a bright display occurs at a low applied voltage and a dark display occurs at a high applied voltage, and a normally black mode in which a dark display occurs at a low applied voltage and a bright display occurs at a high applied voltage.

When a polarizing plate or an optical member is provided on both sides of a liquid crystal cell, it may be either the same or a different polarizing plate or optical member. In order to form a liquid crystal display, one layer or two or more layers of appropriate parts such as a brightness promoting film, a prism array sheet, a lens array sheet, a photo conductive board, an optical diffusion board, a back light, and the like may be installed in appropriate positions.

The liquid crystal display element of the present invention is excellent in visibility. Specifically, when a display panel is viewed from the front side in a dark display mode by the naked eye, there are no occasions in which excessively bright points and planes emerge resulting in impaired visibility or an unfavorable sensation, a light source causes a glare directly or indirectly, or a reflected image is seen.

EXAMPLES

The present invention is described below in more detail by way of examples. Note that the present invention is not limited to the following examples.

The following tests and evaluations were conducted in Examples and Comparative Examples.

Refractive Index

The refractive index was measured using a high speed spectroscopic ellipsometer ("M-2000U" manufactured by J. A. Woollam) at a wavelength of 245 to 1,000 nm and incident angles of 55°, 60°, and 65°. The refractive index was calculated using the measured values.

Light Reflectance

The light reflectance was measured using an ultraviolet/visible/near-infrared spectrophotometer ("V-570" manufactured by Jasco Corp.). The reflection spectrum was measured at an incident angle of 5° and the reflectance at a wavelength of 430 to 700 nm was measured to determine the reflectance at 550 nm and the maximum reflectance at 430 to 700 nm.

Total Light Transmittance

The light reflectance was measured using a haze meter ("NDH2000" manufactured by Nippon Denshoku Co., Ltd.). JIS K7361-1 (ISO13468-1) "Test method of total light transmittance of transparent plastic material" was followed.

Visibility

Of the polarizing plate protective films of a commercially available liquid crystal display, the protection film attached to the viewer's side was peeled off and, instead, reflection preventing layered products of Examples 1-5 and Comparative Examples 1-6 were attached in a way in which the low refractive index layer could become the front side. The liquid crystal display at a dark display mode was viewed by the naked eye from the front and evaluated according to the following three step criteria. The term "glare" indicates an unfavorable sensation and poor visibility due to too high a brightness of points and planes within the range of vision.
Good: No glare or external image reflection at all
Fair: Slight glare or external image reflection
Bad: Glare and external image reflection seen on the entire screen Surface Resistance Surface resistance was measured using a resistivity meter ("MCP-HT260" manufactured by Mitsubishi Chemical Corp.). The sample was allowed to stand in an atmosphere at 20° C. and 60% RH for one day. The surface resistance was measured in the same atmosphere.

Antistatic Effect

Small pieces of paper cut into 1 mm×1 mm sheets were scattered over the surface of a reflection preventing layered product to evaluate attachability and removability with cloth according to the following criteria.
Good: No paper attachment or good removability
Bad: Paper attached and difficult removal Scratch Resistance Scratch resistance was measured using a Gakushin-type fastness tester. The surface treated for reflection prevention was rubbed with steel wool #0000 back and forth ten times at a load of 0.025 MPa to observe the degree of scratching by the naked eye. Samples with no scratches were rated as "Good", with 10 or less slight scratches as "Fair", and more than 10 slight scratches or having a normal or large scratch as "Bad".

Example 1

100 parts by weight of an antimony pentoxide modified alcohol sol (manufactured by Catalysts & Chemicals Industries Co., Ltd., solid content: 30%), 10 parts by weight of UV-curable urethane acrylate ("UV7000B" manufactured by Nippon Synthetic Chemical Industry Co., Ltd.), and 0.4 part by weight of a photoinitiator ("Irgacur 184" manufactured by Ciba Geigy) were mixed to prepare a UV-curable coating liquid 1 for a high refractive index layer.

A tetramethoxysilane oligomer ("Methyl Silicate 511" manufactured by Colcoat Co., Ltd.) and methanol were mixed at a weight ratio of 47:75 to prepare a liquid A. Water, aqueous ammonia (ammonia 28 wt %), and methanol were mixed at a weight ratio of 60:1.2:97.2 to prepare a liquid B. The liquid A and the liquid B were mixed at a ratio by weight of 16:17 to prepare a coating liquid 1 for a low refractive index layer.

A norbornene polymer film ("Zeonoa film ZF14-100" manufactured by Zeon Corp., thickness: 100 µm, refractive index: 1.53) was used as the transparent plastic film A. The coating liquid 1 for a high refractive index layer was applied to one side of the film using a wire bar to a thickness of 5 µm. The coating was dried and irradiated with UV light (cumulative dose: 500 mW/cm$^2$) to form a high refractive index layer. The surface resistance in the high refractive index layer was $1.0 \times 10^9$ ohm/square inch.

The coating liquid 1 for a low refractive index layer was applied onto this high refractive index layer using a spin coater (700 rpm×10 seconds). Air in the spin coater rotating room was previously saturated with methanol. The film A on which the coating liquid 1 for a low refractive index layer was applied was allowed to stand for 75 seconds and immersed for one day in a cure solution prepared by mixing water, 28 wt % aqueous ammonia, and methanol at a weight ratio of 162:4:640. Next, the film A was immersed in a 0.10 wt % isopropanol solution of hexamethyldisilane for a hydrophobizing treatment.

After washing with isopropanol, the hydrophobized film A was placed in a pressure vessel. The vessel was filled with liquefied carbon dioxide and the film A was supercritically dried at 80° C. and 16 MPa for two hours to form a low refractive index layer with a thickness of 100 nm on the high refractive index layer, thereby obtaining a reflection preventing layered product 1. The refractive index of the low refractive index layer of this reflection preventing layered product 1 was 1.33.

The surface resistance of the reflection preventing layered product 1 was $2.0 \times 10^9$ ohm/square inch and the total light transmittance was 96%. The tests for visibility, antistatic effect, and scratch resistance were carried out using the resulting reflection preventing layered product 1. Values for refractive index, etc. and results of these tests are summarized in Table 1.

Example 2

100 parts by weight of methyl ethyl ketone sol of phosphorous-doped tin (IV) oxide (PTO) (manufactured by Catalysts & Chemicals Industries Co., Ltd., solid content: 30%), 10 parts by weight of UV-curable urethane acrylate ("UV7000B" manufactured by Nippon Synthetic Chemical Industry Co., Ltd.), and 0.4 parts by weight of a photoinitiator ("Irgacur 184" manufactured by Ciba Geigy) were mixed to prepare a UV-curable coating liquid 2 for a high refractive index layer.

A cellulose triacetate film ("KC8LX2M" manufactured by the Konica Minolta Co., Ltd., thickness: 80 μm, refractive index: 1.49) was used as the transparent plastic film B. The coating liquid 2 for a high refractive index layer was applied to one side of the film to a thickness of 2 μm. The coating was dried and irradiated with UV light (cumulative dose: 500 mW/cm$^2$) to form a high refractive index layer. The procedure of Example 1 was followed to form a low refractive index layer to obtain a reflection preventing layered product 2.

The surface resistance of the reflection preventing layered product 2 was $5.0 \times 10^8$ ohm/square inch and the total light transmittance was 94%. The tests for visibility, antistatic effect, and scratch resistance were carried out using the resulting reflection preventing layered product 2. Values for refractive index, etc. and results of these tests are summarized in Table 1.

Example 3

A high refractive index layer and a low refractive index layer were formed and a reflection preventing layered product 3 was obtained in the same manner as in Example 1 except for using a polyethylene terephthalate film ("Lumirror U426" manufactured by Toray Industries Inc., thickness: 188 μm, refractive index: 1.60) as a transparent plastic film C.

The surface resistance of the reflection preventing layered product 3 was $2.0 \times 10^9$ ohm/square inch and the total light transmittance was 94%.

The tests for visibility, antistatic effect, and scratch resistance were carried out using the resulting reflection preventing layered product 3. Values for refractive index, etc. and results of these tests are summarized in Table 1.

Example 4

35.7 parts by weight of a silicone-based hard coating agent ("SolGard NP720" manufactured by Nippon Dacro Shamrock Co., Ltd., solid content: 28 wt %) was added to 100 parts by weight of an antimony pentoxide ethanol sol (manufactured by Catalysts & Chemicals Industries Co., Ltd., solid content: 30 wt %) to obtain a heat-curable coating liquid 3 for a high refractive index layer.

Using the transparent plastic film A as the transparent plastic film, the coating liquid 3 for a high refractive index layer was applied to one side of the film to a thickness of 2 μm. The coating was dried and heated at 80° C. for two hours to obtain a high refractive index layer. The surface resistance in the high refractive index layer was $2.0 \times 10^9$ ohm/square inch. The procedure of Example 1 was followed to form a low refractive index layer to obtain a reflection preventing layered product 4.

The surface resistance of the reflection preventing layered product 4 was $3.0 \times 10^9$ ohm/square inch and the total light transmittance was 96%. The tests for visibility, antistatic effect, and scratch resistance were carried out using the resulting reflection preventing layered product 4. Values for refractive index, etc. and results of these tests are summarized in Table 1.

Example 5

356 parts of methanol was added to 208 parts of tetraethoxysilane. 18 parts of water and 18 parts of a 0.01N hydrochloric acid aqueous solution ($H_2O$/OR=0.5) were further added, followed by sufficient stirring using a homogenizer to obtain a mixture. The mixture was stirred in a thermostat vessel at 25° C. for two hours to obtain a silicone resin solution of which the weight average molecular weight was adjusted to 850. A hollow silica isopropanol dispersion sol (manufactured by Catalysts & Chemicals Industries Co., Ltd., solid content: 20 wt %, average primary particle diameter: about 35 nm, shell thickness: about 8 nm) was added to the silicone resin solution as hollow silica fine particles so that the weight ratio of "hollow silica fine particles/silicone resin (converted into condensation compound)" was 70:30 as solid. The mixture was diluted with methanol so that the total solid content was 1% to obtain a coating liquid 2 for a low refractive index layer.

A high refractive index layer was formed on the transparent plastic film A in the same manner as in Example 1. The coating liquid 2 for a low refractive index layer was applied to the high refractive index layer using a wire bar and dried at 120° C. for two minutes to obtain a low refractive index layer with a thickness of 100 nm. The laminated film was irradiated with UV light at a cumulative dose of 400 mJ/cm$^2$ to obtain a reflection preventing layered product 5. The refractive index of the low refractive index layer was 1.36.

The surface resistance of the reflection preventing layered product 5 was $2.0 \times 10^9$ ohm/square inch and the total light transmittance was 94%. The tests for visibility, antistatic effect, and scratch resistance were carried out using the resulting reflection preventing layered product 5. Values for refractive index, etc. and results of these tests are summarized in Table 1.

Comparative Example 1

100 parts by weight of an antimony pentoxide modified alcohol sol (manufactured by Catalysts & Chemicals Industries Co., Ltd., solid content: 30%), 15 parts by weight of UV-curable urethane acrylate ("UV7000B" manufactured by Nippon Synthetic Chemical Industry Co., Ltd.), and 0.6 parts by weight of a photoinitiator ("Irgacur 184" manufactured by Ciba Geigy) were mixed to prepare a UV-curable coating liquid 4 for a high refractive index layer.

Using the transparent plastic film A as the transparent plastic film, the coating liquid 4 for a high refractive index layer was applied to one side of the film to a thickness of 5 μm. The coating was dried and irradiated with UV light (cumulative dose: 500 mW/cm$^2$) to form a high refractive index layer.

The procedure of Example 1 was followed to form a low refractive index layer to obtain a reflection preventing layered product 6.

The surface resistance of the reflection preventing layered product 6 was $1.0 \times 10^{11}$ ohm/square inch and the total light transmittance was 96%. The tests for visibility, antistatic effect, and scratch resistance were carried out using the resulting reflection preventing layered product 6. Values for refractive index, etc. and results of these tests are summarized in Table 1.

Comparative Example 2

A coating liquid 3 for a low refractive index layer was prepared in the same manner as the method for preparing the coating liquid 1 for a low refractive index layer in Example 1, except for mixing tetramethoxysilane oligomer and methanol at a weight ratio of 47:78 when preparing the liquid A of the coating liquid 1 for a low refractive index layer.

A reflection preventing layered product 7 was obtained by forming a high refractive index layer and a low refractive index layer in the same manner as in Example 1 except for using the coating liquid 2 for a low refractive index layer instead of the coating liquid 1 for a low refractive index layer. The refractive index of the low refractive index layer was 1.39.

The surface resistance of the reflection preventing layered product 7 was $3.0 \times 10^9$ ohm/square inch and the total light transmittance was 96%. The tests for visibility, antistatic effect, and scratch resistance were carried out using the resulting reflection preventing layered product 7. Values for refractive index, etc. and results of these tests are summarized in Table 1.

Comparative Example 3

A coating liquid 4 for a low refractive index layer was prepared in the same manner as the method for preparing the coating liquid 1 for a low refractive index layer in Example 1, except for mixing tetramethoxysilane oligomer and methanol at a weight ratio of 47:79 when preparing the liquid A of the coating liquid 1 for a low refractive index layer.

A reflection preventing layered product 8 was obtained by forming a high refractive index layer and a low refractive index layer in the same manner as in Example 1 except for using the coating liquid 4 for a low refractive index layer instead of the coating liquid 1 for a low refractive index layer. The refractive index of the low refractive index layer was 1.40.

The surface resistance of the reflection preventing layered product 8 was $3.0 \times 10^9$ ohm/square inch and the total light transmittance was 96%. The tests for visibility, antistatic effect, and scratch resistance were carried out using the resulting reflection preventing layered product 8. Values for refractive index, etc. and results of these tests are summarized in Table 1.

Comparative Example 4

100 parts by weight of antimony-doped tin oxide ethyl cellosolve sol ("P-3055" manufactured by Catalysts & Chemicals Industries Co., Ltd., solid content: 25%), 12.5 parts by weight of UV-curable urethane acrylate ("UV7000B" manufactured by Nippon Synthetic Chemical Industry Co., Ltd.), and 0.5 part by weight of a photoinitiator ("Irgacur 184" manufactured by Ciba Geigy) were mixed to prepare a UV-curable coating liquid 5 for a high refractive index layer.

A coating with a thickness of 2 μm was obtained in the same manner as in Example 1 except for using the coating liquid 5 for a high refractive index layer instead of the coating liquid 1 for a high refractive index layer. The coating was dried and irradiated with UV light (cumulative dose: 500 mW/cm$^2$) to form a high refractive index layer. The procedure of Example 1 was followed to form a low refractive index layer to obtain a reflection preventing layered product 9.

The surface resistance of the reflection preventing layered product 9 was $5.0 \times 10^8$ ohm/square inch and the total light transmittance was 87%. The tests for visibility, antistatic effect, and scratch resistance were carried out using the resulting reflection preventing layered product 9. Values for refractive index, etc. and results of these tests are summarized in Table 1.

Comparative Example 5

100 parts by weight of zinc antimonate methanol sol ("Celnax CXZ300M-1F" manufactured by Nissan Chemical Industries, Ltd. solid content: 30%), 12.5 parts by weight of UV-curable urethane acrylate ("UV7000B" manufactured by Nippon Synthetic Chemical Industry Co., Ltd.), and 0.5 parts by weight of a photoinitiator ("Irgacur 184" manufactured by Ciba Geigy) were mixed to prepare a UV-curable layered product 6 for a high refractive index layer.

A coating with a thickness of 2 μm was obtained in the same manner as in Example 1 except for using the layered product 6 for a high refractive index layer instead of the coating liquid 1 for a low refractive index layer. The coating was dried and irradiated with UV light (cumulative dose: 500 mW/cm$^2$) to form a high refractive index layer. The procedure of Example 1 was followed to form a low refractive index layer to obtain a reflection preventing layered product 10.

The surface resistance of the reflection preventing layered product 10 was $5.0 \times 10^8$ ohm/square inch and the total light transmittance was 88%. The tests for visibility, antistatic effect, and scratch resistance were carried out using the resulting reflection preventing layered product 10. Values for refractive index, etc. and results of these tests are summarized in Table 1.

Comparative Example 6

A coating liquid 5 for a low refractive index layer was prepared in the same manner as the method for preparing the coating liquid 1 for a low refractive index layer in Example 1, except for mixing tetramethoxysilane oligomer and methanol at a weight ratio of 47:72 when preparing the liquid A of the coating liquid 1 for a low refractive index layer.

A reflection preventing layered product 11 was obtained by forming a high refractive index layer and a low refractive index layer in the same manner as in Example 1 except for using the coating liquid 5 for a low refractive index layer instead of the coating liquid 1 for a low refractive index layer. The refractive index of the low refractive index layer was 1.24.

The surface resistance of the reflection preventing layered product 11 was $2.0 \times 10^9$ ohm/square inch and the total light transmittance was 96%. The tests for visibility, antistatic effect, and scratch resistance were carried out using the resulting reflection preventing layered product 11. Values for refractive index, etc. and results of these tests are summarized in Table 1.

TABLE 1

| | Transparent plastic film | High refractive index layer No. | High refractive index Refractive index (-) | Low refractive index layer No. | Low refractive index Refractive index (-) | Light reflectance (%) 550 nm | Light reflectance (%) 430-700 nm | Surface resistance (ohm/square inch) | Total light transmittance (%) | Visibility | Antistatic effect | Scratch resistance |
|---|---|---|---|---|---|---|---|---|---|---|---|---|
| Example 1 | A | 1 | 1.62 | 1 | 1.33 | 0.45 | 1.0 | $2.0 \times 10^9$ | 96 | Good | Good | Good |
| Example 2 | B | 2 | 1.68 | 1 | 1.33 | 0.42 | 0.9 | $5.0 \times 10^8$ | 94 | Good | Good | Good |
| Example 3 | C | 1 | 1.62 | 1 | 1.33 | 0.45 | 1.0 | $2.0 \times 10^9$ | 94 | Good | Good | Good |
| Example 4 | A | 3 | 1.62 | 1 | 1.33 | 0.45 | 1.1 | $3.0 \times 10^9$ | 96 | Good | Good | Fair |
| Example 5 | A | 1 | 1.62 | 2 | 1.36 | 0.60 | 1.8 | $2.0 \times 10^9$ | 94 | Good | Good | Good |
| Comparative Example 1 | A | 4 | 1.60 | 1 | 1.33 | 0.50 | 1.1 | $1.0 \times 10^{11}$ | 96 | Good | Bad | Good |
| Comparative Example 2 | A | 1 | 1.62 | 3 | 1.39 | 1.30 | 1.9 | $3.0 \times 10^9$ | 96 | Bad | Good | Good |
| Comparative Example 3 | A | 1 | 1.62 | 4 | 1.40 | 1.40 | 2.0 | $3.0 \times 10^9$ | 96 | Bad | Good | Good |
| Comparative Example 4 | A | 5 | 1.67 | 1 | 1.33 | 0.43 | 1.0 | $5.0 \times 10^8$ | 87 | Bad | Good | Good |
| Comparative Example 5 | A | 6 | 1.67 | 1 | 1.33 | 0.44 | 0.9 | $5.0 \times 10^8$ | 88 | Bad | Good | Good |
| Comparative Example 6 | A | 1 | 1.62 | 5 | 1.24 | 0.32 | 0.9 | $2.0 \times 10^9$ | 96 | Good | Good | Bad |

It can be seen from Table 1 that the reflection preventing layered products 1-5 of Examples 1-5 produced by forming a high refractive index layer on a transparent plastic film and laminating a low refractive index layer with a refractive index of 1.25 to 1.37 on the high refractive index layer, having a surface resistance of $1.0 \times 10^{10}$ ohm/square inch or less and a total light transmittance of 94% or more, satisfy all of the required visibility, antistatic effect, and mechanical strength characteristics. In particular, the reflection preventing layered products 1 to 3 and 5 of Examples 1 to 3 and 5 in which a high refractive index layer containing an activated energy ray-curable resin was formed exhibited excellent visibility, antistatic effect, and mechanical strength.

In contrast, the reflection preventing layered product of Comparative Example 1 exhibited a poor antistatic effect, although its visibility and scratch resistance were excellent. The reflection preventing layered products of Comparative Examples 2 to 5 exhibited poor visibility, although the antistatic effects and scratch resistance were excellent. The reflection preventing layered product of Comparative Example 6 exhibited poor scratch resistance, although the visibility and antistatic effect were excellent.

INDUSTRIAL APPLICABILITY

The reflection preventing layered product of the present invention excels in transparency, mechanical strength, antistaticity, and reflection preventing characteristics. Productivity is also excellent.

The optical member of the present invention possesses excellent reflection preventing capability, antistatic characteristics, mechanical strength, and productivity due to the use of the reflection preventing layered product of the present invention.

The liquid crystal display element of the present invention includes a polarizing plate with the reflection preventing layered product of the present invention, excels in transparency, mechanical strength, visibility, antistaticity, and reflection preventing characteristics, and can be produced at low cost.

The invention claimed is:

1. A reflection preventing laminated body comprising a high refractive index layer and a low refractive index layer, which has a refractive index lower than that of the high refractive index layer, laminated in that order on a transparent plastic film directly or through another layer, wherein the high refractive index layer comprises conductive fine particles and at least one of an activated energy ray-curable resin and a heat-curable resin, and has a surface resistance of $5.0 \times 10^9$ ohm/square inch or less, and the low refractive index layer is made of an aerogel, and has a surface resistance of $1.0 \times 10^{10}$ ohm/square inch or less and a refractive index of 1.25 to 1.37, the reflection preventing laminated body having a total light transmittance of 94% or more.

2. The reflection preventing laminated body according to claim 1, wherein the high refractive index layer comprises conductive fine particles and an activated energy ray-curable resin.

3. The reflection preventing laminated body according to claim 2, wherein the conductive fine particles are fine particles of at least one of antimony pentaoxide and phosphorus-doped tin oxide.

4. The reflection preventing laminated body according to claim 1, wherein the refractive index of the high refractive index layer is 1.55 or more.

5. An optical member comprising the reflection preventing laminated body according to claim 1.

6. The optical member according to claim 5, which is a polarizing plate with a reflection preventing function used for a liquid crystal display.

7. A liquid crystal display element comprising the polarizing plate with a reflection preventing function according to claim 6.

8. The reflection preventing laminated body according to claim 1, wherein the conductive fine particles are fine particles of at least one of antimony pentaoxide and phosphorus-doped tin oxide.

9. The reflection preventing laminated body according to claim 1, wherein the low refractive index layer is laminated directly on the high refractive index layer.

* * * * *